April 7, 1964  A. G. FRAZER-NASH  3,128,071

LOAD CARRYING DEVICES FOR AIRCRAFT AND OTHER VEHICLES

Filed Dec. 24, 1962

*Inventor*

A.G. FRAZER-NASH

By Holcombe, Wetherill & Brisebois
*Attorneys*

United States Patent Office 3,128,071
Patented Apr. 7, 1964

3,128,071
LOAD CARRYING DEVICES FOR AIRCRAFT
AND OTHER VEHICLES
Archibald Goodman Frazer-Nash, 84 Kingston Hill,
Kingston-on-Thames, Surrey, England
Filed Dec. 24, 1962, Ser. No. 246,787
Claims priority, application Great Britain Jan. 4, 1962
5 Claims. (Cl. 248—1)

Loads such as extra fuel tanks, bombs or supplies which are carried on aircraft and have to be released are commonly suspended by releasable hooks. Some provision is necessary to steady the load and prevent it swinging around when the aircraft is in motion. One way of doing this is by means of pads which are mounted on fixed supports on the aircraft and are screwed down into contact with the load whilst the load is suspended by the hooks. These are known as crutching pads or sometimes swaybraces. The pads exert a thrust on the load which is partly lateral and partly in opposition to the force exerted by the hooks and so steady the load. Quite commonly four separate pads are used for each load.

One trouble that has occurred with these pads however, is that there has not been any limit to the force which they can exert. If the pads are screwed down too tightly against the load damage may occur either to the load or to the hooks by which they are suspended.

According to the present invention, a crutching pad assembly or sway-brace comprises a pad carried by a thrust piece which is adjustably mounted on a support, and a spring or other resilient means acts between the thrust piece and the pad to allow relative movement to take place until a predetermined thrust is exerted by the resilient means on the pad, after which abutment surfaces come into contact with each other to prevent further relative movement between the pad and the thrust piece.

In use, the load is suspended by its releasable hooks and the thrust piece of the assembly is adjusted in position on its support until the pad is brought just into contact with the load. Movement of the thrust piece is then continued to stress the spring or other resilient means until the abutment surfaces come into contact with each other. The thrust piece is then locked in its final adjusted position on its support. After the assembly has been set in this way, the predetermined thrust, which depends upon the nature of the spring or other resilient means and upon the relative movement between the pad and the thrust piece, is exerted on the load by the pad. The predetermined load is set so that it is sufficient to hold the load steady but does not cause any excessive stresses on the load or on any other parts. In practice the thrust piece need not be left in a position in which the abutment surfaces are in contact with each other; it may instead be eased back a little so that the pad is resiliently movable relatively to the thrust piece under the action of the spring or other resilient means. This provides a certain amount of resilience in the mounting of the load. When the pad is used in this way it is preferable to provide some sort of indicator to show how much the spring or other resilient means is being stressed and so to indicate the thrust exerted on the load by the pad.

The thrust piece is preferably in the form of a screw threaded block which is screwed into a sleeve which forms a part of the support. The position of the pad is adjusted by screwing the block further into, or out of, the sleeve. The pad itself may have a spherical surface on a member by which it is connected to the thrust piece. The two spherical surfaces are slidable on each other to allow the pad to rock in any direction and so allow the pad to take up a position in which it bears evenly on the load over its whole area.

The member by which the pad is connected to the thrust piece may have a neck which slides in a hole in the thrust piece and the member itself is then made a sliding fit in a part of the sleeve. This allows the pad to move to and fro, towards and away from the thrust piece along the axis of the sleeve. The resilient means which urges the pad against the load is preferably a compression spring which surrounds the neck of the member connecting the pad to the thrust block and this spring has one end bearing against the member and the other end bearing against the thrust piece. In order to prevent the thrust piece from working loose if the assembly is subjected to vibration as is commonly the case, means are preferably provided for locking the screw threaded block in position within the sleeve after it has been set.

An example of a crutching pad assembly or swaybrace constructed in accordance with the invention is illustrated in the accompanying drawings, in which.

Figure 1:
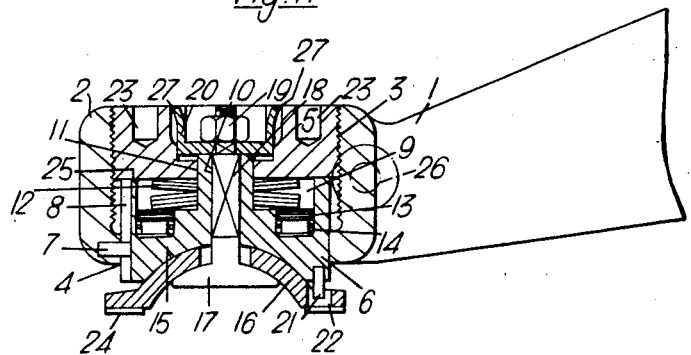
FIGURE 1 is a vertical section through the assembly.

The assembly is mounted on the end of an arm part of which is shown at 1 and which is fixed to the aircraft or other vehicle on which the load to be steadied by the pad is carried. The arm 1 is formed at its free end with an integral sleeve 2 having an internal bore. This bore is in two parts, the upper part 3 being screw threaded and the lower part 4 being of slightly smaller diameter than the upper part 3 and being smooth. A thrust piece in the form of a circular block 5 is screwed into the upper part 3 of the bore in the sleeve 2 and a further block 6, which is smooth and cylindrical is a sliding fit within the lower part 4 of the bore.

The block 6 is prevented from rotating within the part 4 by a pin 7 which is fixed in the wall of the bore 4 and projects into a vertical keyway 8 cut in the wall of the block 6. The block 6 has an annular recess 9 in its upper end and projecting centrally from the centre of this recess is a tubular neck 10. The neck 10 is a sliding fit in a circular hole 11 extending through the thrust block 5.

Between the underside of the thrust block 5 and the block 6, that is within the recess 9 are a group of Belville washers 12 which form a compression spring. The upper end of the spring formed by the washers 12 acts on the underside of the thrust block 5 and the bottom end of this spring acts on an anti-friction pack 13 contained in an annular groove 14 which is formed in the block 6 at the bottom of the recess 9. The anti-friction pack 13 allows the thrust block 5 to turn within the sleeve 2 relative to the block 6, which is itself prevented from rotating by the pin 7.

The bottom of the block 6 has a part spherical surface 15 and seating on this is the part spherical top surface of a crutching pad 16. The pad is held in position on the block 6 by the head 17 of a bolt 18 which extends upwards through the hollow neck 10. The bolt 18 is itself held in position by a nut 19 and a spring cup washer 20. The pad 16 is prevented from turning relatively to the block 6 by a pin 21 which extends downwards from the block 6 and engages in a hole 22 in the pad 16.

In use, the load, which is steadied by a number of crutching pads, is fitted in position by its releasable hooks or other means and then, in each crutching pad assembly, the thrust block 5 is screwed downwards by means of a key which fits in two diametrically opposite holes 23 in the top of the block. The screwing down of the block 5, and with it the block 6 and the pad 16 continues until a resilient washer 24 stuck to the bottom of the pad 16 comes into contact with the load. At the time that this happens, the top surface 25 of the block 6 is held clear of the bottom surface of the block 5 by the washers 12 which, due to their compression, hold the underside of the washer 20 firmly against the block 5. After the washer 24 has come into contact with the load, screwing up of the block 5 continues until the underside of the block which forms one abutment comes into contact with the surface 25 on the block 6, which forms a second abutment. The contact of these two abutments prevents further relative movement between the blocks 5 and 6 and the relative movement which has thus far taken place causes a predetermined compressive force to be produced in the washers 12. This force is exerted on the load by the pad 16.

If it is required to hold the load firmly in position with this predetermined force, the block 5 is now locked in position. This can be done either by a cotter pin 26 which is tightened and comes into contact with the outside of the thread on the block 5 within the sleeve 2, or, it can alternatively be done by providing projections 27 on the spring washer 20. These projections engage in any one of a number of serrations 28 provided all the way round the inside of a recess in the top of the block 5.

Figure 2:
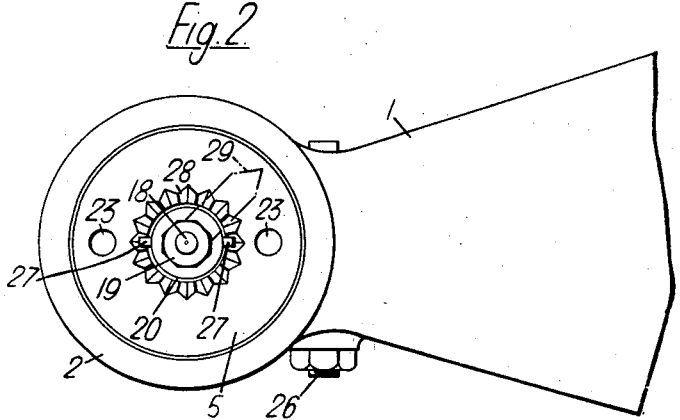
FIGURE 2 is a plan.

Instead of locking the block 5 in its fully tightened position however, the block 5 may be slackened back a little after its underside has come into contact with the abutment surface 25. When this is done the force applied to the load by the pad 16 is slightly decreased because the compression of the Belville washers 12 is decreased and also, the block 6 and with it the pad 16 is given a slight freedom of movement against the action of the washers 12. There is thus a slight resilience in the mounting of the load. When it is intended that the block 5 should be slackened back in this way, it is desirable to provide an indicator to show how much the block has been slackened and thus to give some indication of the force still applied by the pads 16 to the load. One form of indicator is a pointer shown in chain dotted lines at 29 in FIGURE 2 of the drawings. The pointer 29 is sandwiched between the nuts 19 and the washer 20 and neither of these rotates as they are held by the bolt 18 which is itself frictionally gripped by the pad 16. The amount by which the block is loosened can be seen by judging the positions of the holes 23 relative to the pointer 29.

The crutching pad assembly described with reference to the drawings is especially intended for steadying loads carried externally on aircraft, it can also of course be used for steadying loads on other vehicles.

I claim:

1. A sway-brace comprising a support, a thrust piece, means adjustably mounting said thrust piece on said support, a pad carried by said thrust piece, first abutment means fixed relatively to said thrust piece, second abutment means fixed relatively to said pad, resilient means acting between said thrust piece and said pad to allow movement of said pad relative to said thrust piece to take place until said first abutment means comes into contact with said second abutment means to prevent further relative movement taking place and said resilient means then exerting a predetermined thrust on said pad, a member connected to said thrust piece, a first spherical surface on said pad and a second spherical surface on said member, said two spherical surfaces being slidable on each other to allow said pad to rock in any direction relative to said member.

2. A sway-brace comprising a support, a sleeve forming part of said support, an internal screw thread in said sleeve, a screw-threaded block adjustably screwed into said sleeve, a pad carried by said screw-threaded block, first abutment means on said block, second abutment means fixed relatively to said pad, resilient means acting between said screw-threaded block and said pad, said pad being movable relative to said block against the action of said resilient means until said first abutment means comes into contact with said second abutment means to prevent further relative movement between said pad and said block and said resilient means exerting a predetermined thrust on said pad when said first and said second abutment means are in contact with each other, a member connected to said screwthreaded block, a first spherical surface on said pad and a second spherical surface on said member, said two spherical surfaces being slidable on each other to allow said pad to rock in any direction relative to said member.

3. A sway-brace as claimed in claim 2, wherein said block has a hole and said member includes a neck slidably fitting in said hole and said member is a sliding fit in said sleeve.

4. A sway-brace as claimed in claim 3, wherein said resilient means is a compression spring which surrounds said neck and acts between said member and said block.

5. A sway-brace comprising a support, a sleeve forming part of said support, an internal screw thread in said sleeve, a screw-threaded block adjustably screwed into said sleeve, a pad carried by said screw-threaded block, first abutment means on said block, second abutment means fixed relatively to said pad, resilient means acting between said screw-threaded block and said pad, said pad being movable relative to said block against the action of said resilient means until said first abutment means comes into contact with said second abutment means to prevent further relative movement between said pad and said block and said resilient means exerting a predetermined thrust on said pad when said first and said second abutment means are in contact with each other, means for locking said screw-threaded block in position in said sleeve, comprising a cotter pin extending through the wall of said sleeve and engaging with the peripheral edge of said block, a spring washer, a projection on said washer and a number of serrations in said block, said projection engaging in one of said serrations.

References Cited in the file of this patent

FOREIGN PATENTS 612,092     Germany _____ Apr. 13, 1935